United States Patent
Oshima et al.

(10) Patent No.: US 8,131,327 B2
(45) Date of Patent: Mar. 6, 2012

(54) MOBILE COMMUNICATION APPARATUS

(75) Inventors: Norifumi Oshima, Tokyo (JP); Hiroshi Suzuki, Tokyo (JP); Akio Suzuki, legal representative, Tokyo (JP); Arata Sato, Tokyo (JP); Tomoo Mizuno, Tokyo (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 269 days.

(21) Appl. No.: 12/690,247

(22) Filed: Jan. 20, 2010

(65) Prior Publication Data

US 2010/0248756 A1    Sep. 30, 2010

(30) Foreign Application Priority Data

Mar. 24, 2009    (JP) .................. P2009-72887

(51) Int. Cl.
*H04M 1/00* (2006.01)
(52) U.S. Cl. .................. 455/575.1; 455/414.1
(58) Field of Classification Search .... 455/575.1–575.4, 455/414.1
See application file for complete search history.

(56) References Cited

U.S. PATENT DOCUMENTS 7,702,733 B2 * 4/2010 Fleck et al. .................. 709/206

FOREIGN PATENT DOCUMENTS

| JP | 2003-228784 A | 8/2003 |
| JP | 2005-057513 A | 3/2005 |

* cited by examiner

*Primary Examiner* — Steven Lim
(74) *Attorney, Agent, or Firm* — Maschoff, Gilmore & Israelsen (57) ABSTRACT

A mobile communication apparatus having a first housing section, a second housing section movably connected to the first housing section, an open/close sensor, an email saving controller and an email sending controller. The second housing section is configured to be open or closed to the first housing section. The open/close sensor configured to sense whether the first housing section and the second housing section are open or closed to each other. The email saving controller configured to save an email addressed to a particular address upon the open/close sensor sensing that the first housing section and the second housing section being closed to each other. The email sending controller configured to send the email saved by the email saving controller to the particular address.

14 Claims, 9 Drawing Sheets

Fig. 1A (FRONT VIEW)   Fig. 1B (SIDE VIEW)

Fig. 2A (FRONT VIEW)   Fig. 2B (SIDE VIEW)

MOBILE COMMUNICATION APPARATUS

CROSS REFERENCE TO RELATED APPLICATIONS

This application is based upon and claims the benefit of priority from the prior Japanese Patent Application No. 2009-72887 filed on Mar. 24, 2009; the entire contents of which are incorporated herein by reference.

BACKGROUND OF THE INVENTION

1. Field of the Invention

The present invention relates to a mobile communication apparatus, and in particular to a mobile communication apparatus having a plurality of housing sections, and to a process for sending an email including safety notification.

2. Description of the Related Art

Safety of a person, particularly an aged one who lives alone is a worry to someone in relation to him or her, particularly to his or her family. Thus, there is a known process for detecting his or her safety by judging that a device of the person is used as usual, and for notifying someone in relation to him or her of a fact that the device is used or not.

There is a known process for storing history data of use of the device on a server so as to avoid too many useless notifications, and for notifying someone by means of the server of a fact that the device was used more than certain times a day or that the device was not used one day, as disclosed in Japanese Patent Publication of Unexamined Applications (Kokai), No. 2003-228784. There is another known process for notifying someone by using an email of a fact that a mobile phone is not used for a certain period of time if that is the case, as disclosed in Japanese Patent Publication of Unexamined Applications (Kokai), No. 2005-57513.

The process disclosed in JP 2003-228784, however, has a problem in that the server for storing the history data of the use of the device is required. The process disclosed in JP 2005-57513 may cause the mobile phone to notify someone of the fact that the mobile phone is being used, apart from notifying someone of the fact that the mobile phone was not used. In such a case, the mobile phone has two workloads of that use and the notification at the same time, possibly causing a delay of the mobile phone's response.

SUMMARY OF THE INVENTION

Accordingly, an advantage of the present invention is that a mobile communication device, which has a housing movably configured to be open and closed, configured to send an email indicating that the mobile communication device was used upon the housing being closed.

To achieve the above advantage, one aspect of the present invention is to provide a mobile communication apparatus having a first housing section, a second housing section movably connected to the first housing section, an open/close sensor, an email saving controller and an email sending controller. The second housing section is configured to be open or closed to the first housing section. The open/close sensor configured to sense whether the first housing section and the second housing section are open or closed to each other. The email saving controller configured to save an email addressed to a particular address upon the open/close sensor sensing that the first housing section and the second housing section being closed to each other. The email sending controller configured to send the email saved by the email saving controller to the particular address.

DETAILED DESCRIPTION OF THE INVENTION

Figures 1A, 1B:
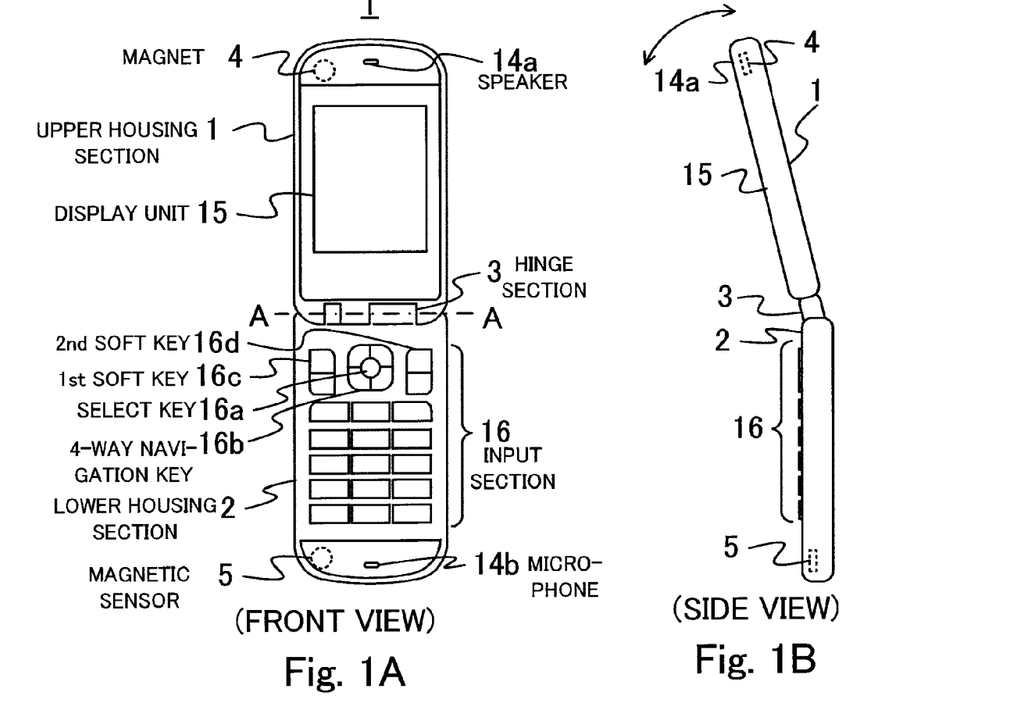
FIG. 1A is a front view of a mobile communization apparatus of an embodiment of the present invention while two housing sections of the mobile communization apparatus are open to each other.
FIG. 1B is a side view of the mobile communization apparatus of the embodiment of the present invention while the two housing sections of the mobile communization apparatus are open to each other.

An embodiment of the present invention will be described with reference to FIGS. 1A-10. FIGS. 1A and 1B show appearances of a flip type mobile communication device of the embodiment having a housing movably configured to be open and closed, while its upper and lower housing sections are open to each other. FIGS. 1A and 1B show a front view and a side view of the mobile communication device, respectively.

The mobile communication device of the embodiment is constituted by an upper housing section 1 and a lower housing section 2 connected to each other through a hinge section 3 such that the upper and lower housing sections 1 and 2 relatively rotate around an axis "A-A", and make an angle between each other from 0 (closed state) to about 180 (open state) degrees.

The upper housing section 1 is provided on its front face with a speaker 14*a* to be used for receiving voice and a display unit 15 to be used for indication for prompting a user to operate the device, indication of content of a user's operation, indication of running status of the device and so on.

The lower housing section 2 is provided on its front face with a microphone 14b to be used for sending voice and an input section 16 formed by a keypad that is an input element. The lower housing section 2 contains an antenna (not shown) to be used for transmitting and receiving electromagnetic waves.

The input section 16 includes a select key 16a, a 4-way navigation key 16b, a first soft key 16c and a second soft key 16d. The select key 16a is used for fixing each of functions or directing a selection. The 4-way navigation key 16a is provided adjacent to and around the select key 16a and constituted by four keys positioned above, below, on the left of and on the right of the select key 16a which are upward, downward, leftward and rightward keys, respectively, and is used for directing to move a cursor position on the display unit 15. The first soft key 16c is provided on an upper left portion of the front face of the lower housing section 2, i.e., around a lower left portion of the display unit 15. The second soft key 16d is provided on an upper right portion of the front face of the lower housing section 2, i.e., around a lower right portion of the display unit 15.

The input section 16 is also provided with numeric keys to be used for entering numerals such as a phone number, and function keys to be used for entering operation directions such as turning on and off power supplied to the mobile communication device. The lower housing section 2 may be provided on a side face thereof with a portion of the keypad of the input section 16.

The upper housing section 1 contains a magnet 4 embedded in the upper portion (being far from the hinge section 3). The lower housing section 2 contains a magnetic sensor element 5 embedded in the lower portion (being far from the hinge section 3), which is, e.g., a Hall element. The magnetic sensor element 5 is arranged such that the magnet 4 comes close to the magnetic sensor element 5 upon the upper and lower housing sections 1 and 2 being closed to each other. The magnetic sensor element 5 senses a magnetic field caused by the magnet 4 so as to sense that upper and lower housing sections 1 and 2 are closed to each other.

The magnetic sensor element 5 senses that the upper and lower housing sections 1 and 2 are closed to each other. Apart from that, the mobile communication device may contain one magnetic sensor element and two magnets embedded in the hinge section 3, and arranged such that either one of the magnets comes close to the magnetic sensor element depending on whether the upper and lower housing sections 1 and 2 are closed or open to each other, so as to sense that the upper and lower housing sections 1 and 2 are closed or open to each other.

Figures 2A, 2B:
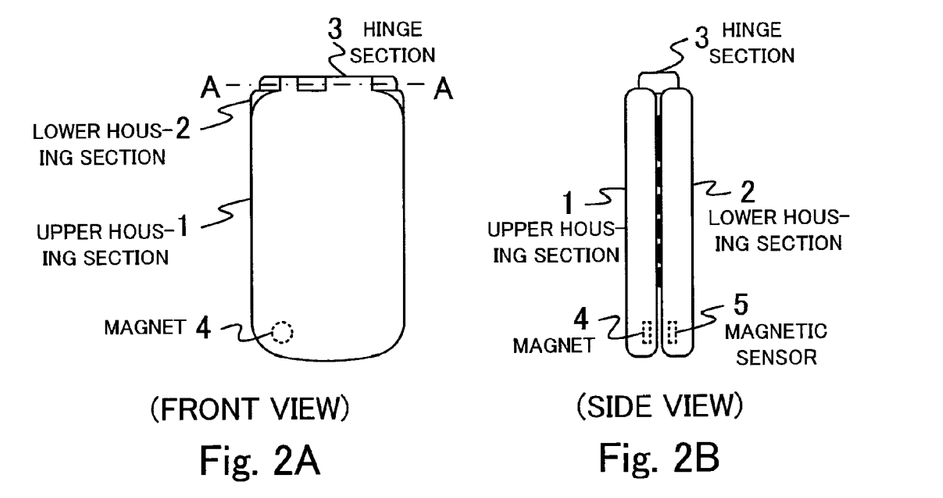
FIG. 2A is a front view of the mobile communization apparatus of the embodiment of the present invention while the two housing sections of the mobile communization apparatus are closed to each other.
FIG. 2B is a side view of the mobile communization apparatus of the embodiment of the present invention while the two housing sections of the mobile communization apparatus are closed to each other.

FIGS. 2A and 2B shows an appearance of the mobile communication device after the upper housing section 1 rotates around the hinge section 3 and comes close to the lower housing section 2 so that both the housing sections 1 and 2 are closed to each other. FIGS. 2A and 2B show a front view and a side view of the mobile communication device in such a condition, respectively. After both the housing sections 1 and 2 are closed, the display unit 15 and the input section 16 are hidden by both the housing sections 1 and 2. Thus, a user neither can view a screen displayed on the display unit 15, nor can operate the keys of the input section 16.

Figure 3:
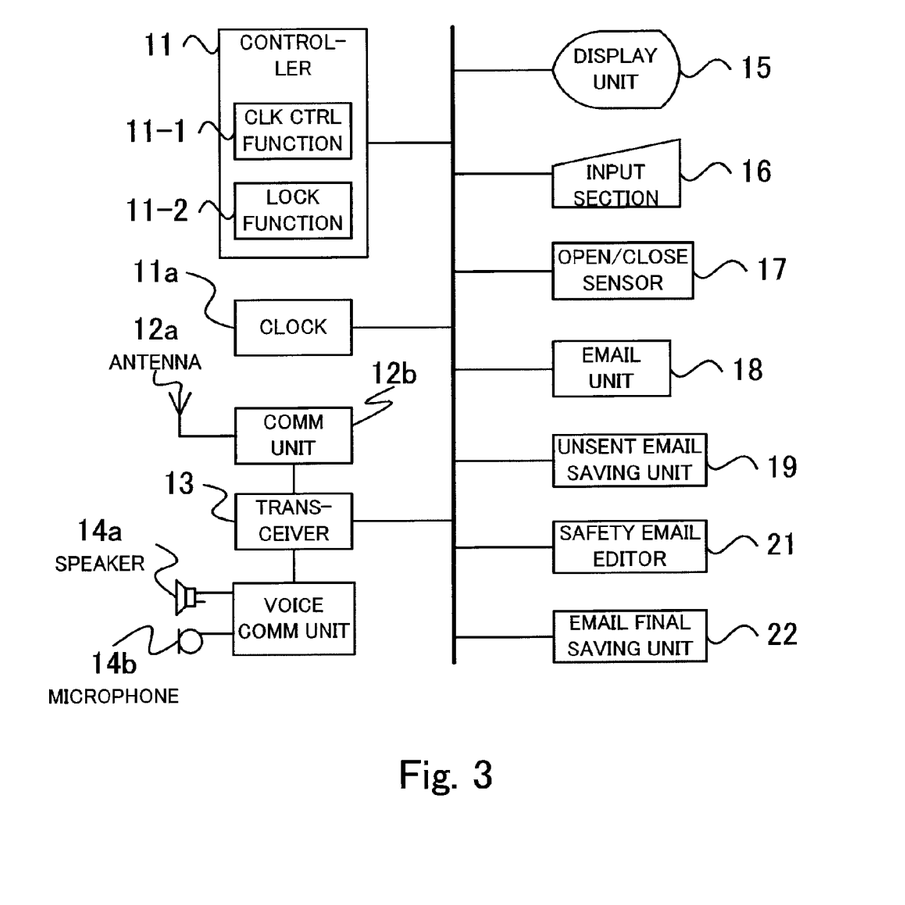
FIG. 3 is a block diagram showing a configuration of the mobile communication apparatus of the embodiment of the present invention.

FIG. 3 is a block diagram showing a configuration of the mobile communication device of the embodiment of the present invention. As shown in FIG. 3, the mobile communication device includes a controller 11 configured to control the whole device, a clock 11a configured to indicate a date and time, an antenna 12a configured to transmit and receive electromagnetic waves to and from a base station (not shown) of a mobile communication network, a communication unit 12b, a transceiver 13, the speaker 14a for voice communication, the microphone 14b for voice communication, a voice communication unit 14c, the display unit 15, the input section 16, an open/close sensor 17, an email unit 18, an unsent email saving unit 19, a safety email editor 21 and an email final saving unit 22.

The controller 11 is configured to implement, by running a program, a clock control function 11-1 and a lock function 11-2 as functions related to the present invention. The unsent email saving unit 19 is configured to save an unsent email that should be sent by the email unit 18 but has not been sent. The email final saving unit 22 is configured to save data of the date and time on which the safety email editor 21 finally saves a safety mail in the unsent email saving unit 19.

The controller 11 may implement functions corresponding to the open/close sensor 17, the email unit 18 and the safety email editor 21 by running a program. The unsent email saving unit 19 and the email final saving unit 22 may be implemented by a same memory device, which further may be included in the controller 11.

Operation of each of the portions of the mobile communication apparatus configured as described above will be explained with reference to FIG. 3.

After the apparatus is at least supplied with power and starts operation, the controller 1 directs the open/close sensor 17 to sense whether the upper and lower housing sections 1 and 2 are open or closed to each other, and saves a result of sensing in the controller 11. Upon being interrupted from the open/close sensor 17, the controller 11 is notified that the upper and lower housing sections 1 and 2 have changed from open to closed or from closed to open to each other.

As described above, the controller 11 always keeps in memory that the upper and lower housing sections 1 and 2 are either open or closed to each other. The controller 11 performs a certain control process depending on the state that the controller 11 keeps in memory, or depending on that the result of sensing changed from open to close or from close to open to each other.

The clock control function 11-1 starts operation on the basis of a certain key operation performed on the input section 16. The clock control function 11-1 changes the clock 11a such that the clock 11a indicates a date and time entered by the certain key operation performed on the input section 16. Further, the clock control function 11-1 erases data of the date and time saved in the email final saving unit 22.

The apparatus is locked upon a certain lock control signal being received from the mobile communication network, and the lock function 11-2 keeps in memory in the controller 11 that the apparatus has been locked. The apparatus is unlocked upon a certain unlock control signal being received from the mobile communication network, and the lock function 11-2 keeps in memory in the controller 11 that the apparatus has been unlocked. If the lock function 11-2 keeps in memory that the apparatus has been unlocked, the controller 11 directs each portion of the apparatus to operate as described later.

Meanwhile, if the lock function 11-2 keeps in memory that the apparatus has been locked, the controller 11 prevents the apparatus from operating regardless of what will be explained below. That is, the controller 11 neglects a key operation performed on the input section 16 except for limited functions such as turning on or off power, and displays an image for notification of being locked on the display unit 15. Then, although the function for receiving the unlock control signal is allowed to operate by means of the controller 11, the communication unit 12b and the transceiver 13, and although the open/close sensor 17 is allowed to operate, the controller 11 prevents the voice communication unit 14c and the portions for other applications including the safety email editor 21 from operating.

As a result, if the lock function 11-2 keeps in memory that the apparatus has been locked all day long, the apparatus never sends a safety mail described later. That is because the apparatus is locked mainly in a case where the apparatus is lost or stolen, the apparatus is very often used by an inauthentic user, and the safety email does hardly make sense regardless of whether the safety email is sent before or after the apparatus is unlocked.

The communication unit 12b provides the transceiver 13 with a radio signal received by the antenna 12a, and transmits a radio signal provided by the transceiver 13 through the antenna 12a.

The transceiver 13 amplifies, frequency-converts and demodulates the radio frequency signal provided by the communication unit 12b so as to provide the voice communication unit 14c, the email unit 18 and the controller 11 with a resultant digital voice signal, an email signal and a control signal including a call arrival signal, respectively. Moreover, the transceiver 13 modulates, frequency-converts and amplifies a digital voice signal, an email signal and a control signal provided by the voice communication unit 14c, the email unit 18 and the controller 11, respectively, so as to obtain a radio frequency signal and to provide the communication unit 12b with the radio frequency signal.

The voice communication unit 14c converts the digital voice signal provided by the transceiver 13 into an analog voice signal, amplifies the analog voice signal and provides the speaker 14a with the amplified analog voice signal. Moreover, the voice communication unit 14c amplifies an analog voice signal provided by the microphone 14b, converts the amplified analog voice signal into a digital voice signal and provides the transceiver 13 with the digital voice signal.

The display unit 15 is an LCD (liquid crystal display) with a backlight. If the upper and lower housing sections 1 and 2 are open to each other, the display unit 15 is controlled by the controller 11 so as to display image data including a cursor, characters and numerals. The display unit 15 is controlled by the controller 1 in response to an input operation performed on the input section 16 or a call arrival signal, so as to change displayed data. If the upper and lower housing sections 1 and 2 are closed to each other, or if no key operation is performed on the input section 16 for a certain period of time while the upper and lower housing sections 1 and 2 are open to each other, the controller 11 displays nothing on the display unit 15. The display unit 15 may be formed by another kind of display, e.g., an organic electro-luminescence display.

The input section 16 is constituted by numeric keys for specifying a phone number of a person to speak to and for entering Japanese syllabaries, alphabets and symbols by using a toggle input method, and a plurality of function keys including a multiple-way navigation key for moving the cursor or scrolling text or an image. If one of the keys of the input section 16 is pressed, the input section 16 notifies the controller 11 of an identifier of the pressed key.

The open/close sensor 17 senses whether the upper and lower housing sections 1 and 2 are open or closed to each other depending upon whether the magnetic sensor element 5 senses a magnetic field. Upon receiving a request for sensing whether the upper and lower housing sections 1 and 2 are open or closed to each other, the open/close sensor 17 notifies the controller 11 whether the upper and lower housing sections 1 and 2 are open or closed to each other. Further, the open/close sensor 17 checks whether the magnetic sensor element 5 senses a magnetic field at certain intervals. Upon sensing that the upper and lower housing sections 1 and 2 have changed from open to closed or from closed to open to each other depending on a result of the above check, the open/close sensor 17 notifies the controller 11 of what has been sensed through an interruption.

The email unit 18 is a processor configured to send and receive emails, and is directed by the controller 11 to start to send an email on the basis of a certain key operation performed on the input section 16.

Then, the email unit 18 composes an email including an email address of an addressee, a subject and a message, and saves the composed email in the unsent email saving unit 19 as an unsent email.

Then, the email unit 18 directs the transceiver 13 to send the unsent email saved in the unsent email saving unit 19. the email is sent through the communication unit 12b, the antenna 12a and the base station to an email server (not shown). Upon finishing sending the email, the transceiver 13 deletes the email that has been sent from the unsent email saving unit 19.

As, in some cases, e.g., the apparatus is positioned out of the service coverage of the mobile communication network, an unsent email saved in the unsent email saving unit 19 cannot be sent to the email server. Thus, the email unit 18 operates at certain intervals so as to direct the transceiver 13 to send the unsent email saved in the unsent email saving unit 19, and to delete the email from the unsent email saving unit 19.

Due to the operation of the email unit 18 for directing the email to be sent, the portions other than the email unit 18 can direct the email to be sent by saving the email address of the addressee, the subject and the message in the unsent email saving unit 19 as an unsent email.

Moreover, upon an email arrival signal being received, the email unit 18 is directed by the controller 11 to receive an email sent from the email server and received by the transceiver 13. Then, the email unit 18 saves the received email in the email unit 18, and ends the operation. The email includes a sender's email address, a subject and a message of the email.

Moreover, the email unit 18 is directed by the controller 11 on the basis of a certain key operation performed on the input section 16 so as to display on the display unit 15 a list of received emails saved in the email unit 18 such as a list of time at which these emails were received and sender's email addresses. Then, the email unit 18 selects one of the emails on the basis of a certain key operation performed on the input section 16, and displays on the display unit 15 details of the selected email, e.g., a message. This operation enables a user to read the received email.

As described above, the email unit 18 specifies the email address of the addressee so as to send the email. The email unit 18 is not limited to the above, and may specify a phone number so as to send an email. The email is converted by an email server that keeps an association between the phone number and an email address in memory (not shown) into an email addressed to the email address associated with the specified phone number, and is sent.

Further, if the mobile communication apparatus has a directory (not shown) that keeps in memory phone numbers and email addresses related to each other, the above phone number may be converted into the email address with reference to the directory.

Upon the upper and lower housing sections 1 and 2 changing from open to closed, the safety email editor 21 is directed by the controller 11 to start an operation. Upon starting the operation for the first time in a day, the safety email editor 21 saves a certain safety email in the unsent email saving unit 19 as an unsent email. The email address of the unsent email is an address of someone in relation to the owner of the apparatus (called the "watcher" hereafter). The safety email editor 21 saves a date and time indicated by the clock 11a at which the safety email is saved in the email final saving unit 22 as a final date and time of safety email saving.

An operation of the mobile communication apparatus of the embodiment of the present invention for sending a safety email will be explained below.

(Operation of Controller 11 for Controlling Whether Safety Email is Sent)

The controller 11 enters whether or not to send a safety email, and in a case of sending further enters an addressee's email address of the safety email, a subject and a message, on the basis of a certain key operation performed on the input section 16. The controller 11 saves whether or not to send the safety email in the controller 11, and saves the entered address, subject and message in the safety email editor 21. The safety email editor 21 may determine the subject and the message beforehand such that, e.g., notification of being safe and sound is included.

Figure 4A:
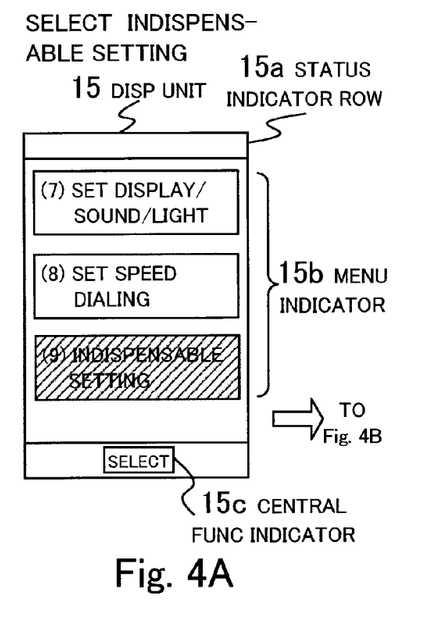
FIGS. 4A-4D show screens displayed on a display unit of the mobile communization apparatus of the embodiment of the present invention for entering various settings.

A control operation for choosing whether or not to send a safety email and for selecting the addressee's email address of the safety email will be explained with reference to content displayed on the display unit 15 during the operation. FIG. 4A shows content of a screen that the controller 11 displays on the display unit 15 for entering various kinds of setting, which is constituted by a status indicator row 15a displayed in an upper portion of the display unit 15, a menu indicator 15b in the middle, and a central function indicator 15c indicating "SELECT" in the middle of a lower portion of the display unit 15.

The status indicator row 15a always indicates symbols representing intensity of an electromagnetic wave transmitted from the base station and received by the antenna 12a, how much power is stored in a storage battery (not shown) that supplies each of the portions of the apparatus with power, and so on.

The menu indicator 15b indicates a menu for various kinds of setting including a cursor located on one of choices in the menu. The choice that the cursor is located on is indicated differently from other choices. In FIG. 4A, a choice "(9) INDISPENSABLE SETTING" is indicated with choices (7) and (8).

Further, in FIG. 4A, the cursor is located on the choice "(9) INDISPENSABLE SETTING", which is indicated by hatching. The cursor moves to upper and lower choices adjacent to the choice on which the cursor is currently located in response to operations of the upward and downward keys of the 4-way navigation key 16b, respectively. Further, as the choice that the cursor is located on changes in response to the operations of the upward and downward keys of the 4-way navigation key 16b, the choices indicated in the menu scroll. Other than the above choices, the menu shown in FIG. 4A includes choices (1)-(6) which are hidden after scrolling.

The central function indicator 15c indicates an operation performed upon the select key 16a being operated, and in this case indicates that the choice that the cursor is located on is selected.

Figure 4B:
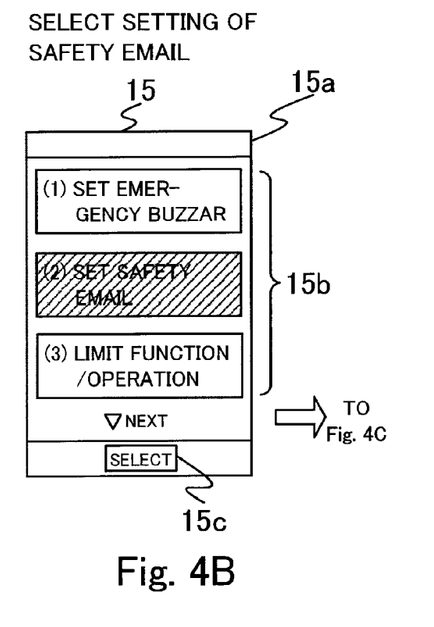

If the select key 16a is operated and an indispensable setting is selected while the screen shown in FIG. 4A is being displayed, a menu indicator 15b formed by choices of a submenu included in "(9) INDISPENSABLE SETTING" is displayed as shown in FIG. 4B. In FIG. 4B, a choice "(2) SET SAFETY EMAIL" is indicated with choices (1) and (3). Further, an indicator "NEXT" indicates that a choice following (3) exists and is indicated in response to an operation of the downward key of the 4-way navigation key 16b.

Figure 4C:
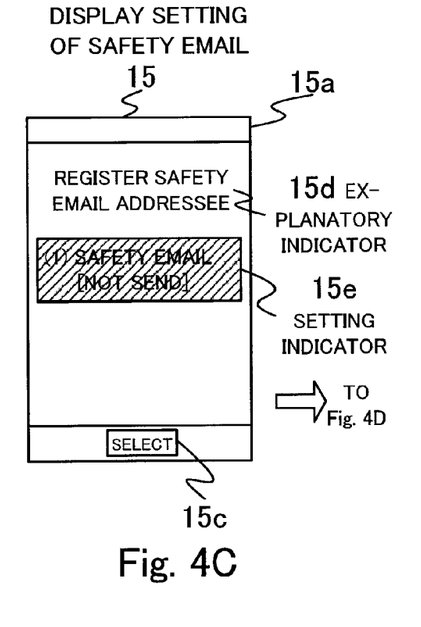

If the select key 16a is operated and a safety email setting is selected while the screen shown in FIG. 4B is being displayed, a screen for setting a safety email is displayed as shown in FIG. 4C. The screen shown in FIG. 4C includes an explanatory indicator 15d for explaining that an addressee to whom a safety email is sent is registered, and a setting indicator 15e that is "(1) SAFETY EMAIL [NOT SEND]" on which the cursor is located. As it is assumed that a safety email is set not to be sent, the setting indicator 15e includes "[NOT SEND]".

Figure 4D:
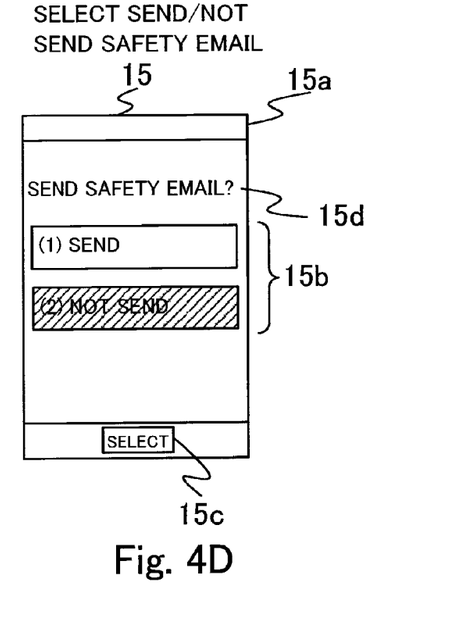

If the select key 16a is operated while the screen shown in FIG. 4C is being displayed, a screen for selecting whether to send or not a safety email is displayed as shown in FIG. 4D. The screen shown in FIG. 4D is constituted by an explanatory indicator 15d asking "SEND SAFETY EMAIL?" and a menu indicator 15b formed by two choices "(1) SEND" and "(2) NOT SEND". The cursor is located on one of the two choices. A reason why the cursor is located on "(2) NOT SEND" in the menu indicator 15b is the above setting indicator 15e including "NOT SEND"

Figure 5A:
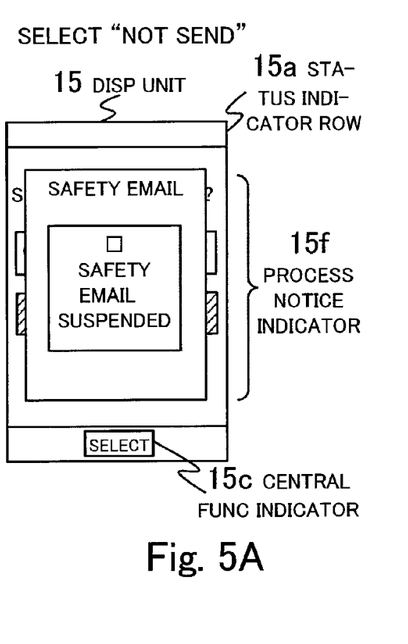
FIGS. 5A and 5B show screens displayed on the display unit upon selection being made with respect to whether to send a safety email.

If the select key 16a is operated while the cursor is being located on "(2) NOT SEND", a process notice indicator 15f indicating that the safety email is suspended appears as a new window as shown in FIG. 5A. If the select key 16a is operated while a screen shown in FIG. 5A is being displayed, the screen for setting a safety email is displayed as shown in FIG. 4C, where the setting indicator 15e includes "[NOT SEND]".

Figure 5B:
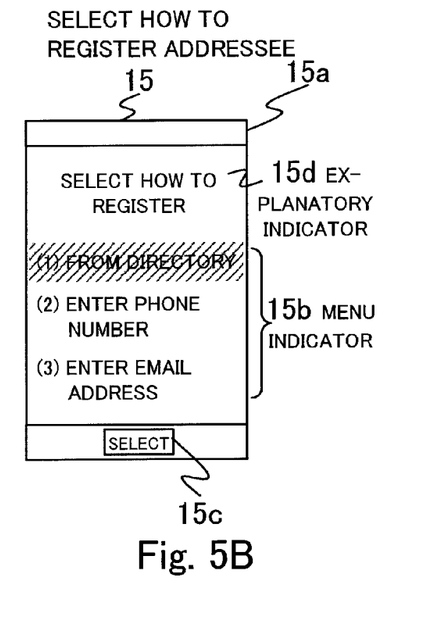

Meanwhile, if the select key 16a is operated while the cursor is being located on "(1) SEND", a screen shown in FIG. 5B is displayed, which includes an explanatory indicator 15d for prompting a user to select a method for registering a safety email addressee and a menu indicator 15b formed by three choices which are "(1) FROM DIRECTORY", "(2) ENTER PHONE NUMBER" and "(3) ENTER EMAIL ADDRESS".

Then, the above three methods for registering the safety email addressee will be explained. If the select key 16a is operated while the cursor is being located on "(1) FROM DIRECTORY" in FIG. 5B, the safety email addressee is set with reference to the directory in a procedure shown in FIGS. 6A-6D. That is, a directory controller (not shown) is activated first, and displays one entry of a person formed by a name, a phone number and an email address stored in the directory as a directory data indicator 15g as shown in FIG. 6A.

Further, it is indicated that either the phone number or the email address of the above three items can be selected as an identifier of the safety email addressee. The cursor is located on the phone number in FIG. 6A, which shows that the phone number is selected as the identifier of the safety email addressee.

A left soft key indicator 15h indicating "MARK" and a right soft key indicator 15i indicating "MENU" are shown on the left and right sides of the central function indicator 15c, respectively. The right soft key indicator 15i indicates an operation performed upon the second soft key 16d being operated. If the second soft key 16d is operated, a menu appears as indicated by the right soft key indicator 15i. If the 4-way navigation key 16b is operated so that one of choices included in the menu is selected and the select key 16a is then operated, a function corresponding to the choice is performed. An example of such a function is the "MARK" function indicated by the left soft key indicator 15h. Further, the left soft key indicator 15h indicates an operation performed upon the first soft key 16c being operated. If the first soft key 16c is operated, a character on which the cursor is located is marked in a magnified font size, as indicated by the left soft key indicator 16c.

Figure 6A:
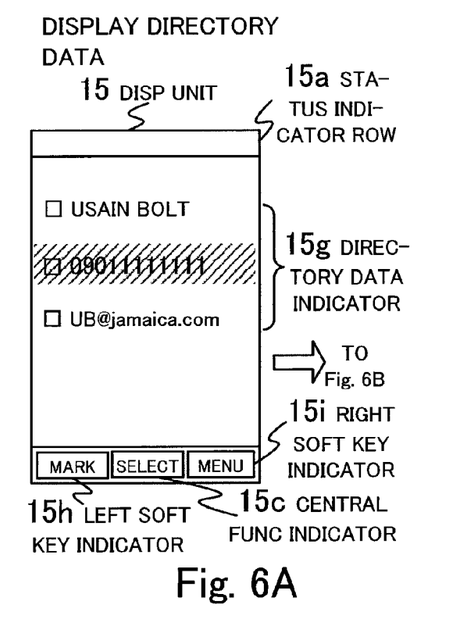
FIGS. 6A-6D show screens displayed on the display unit for choosing from a directory and setting a safety email addressee.
Figure 6B:
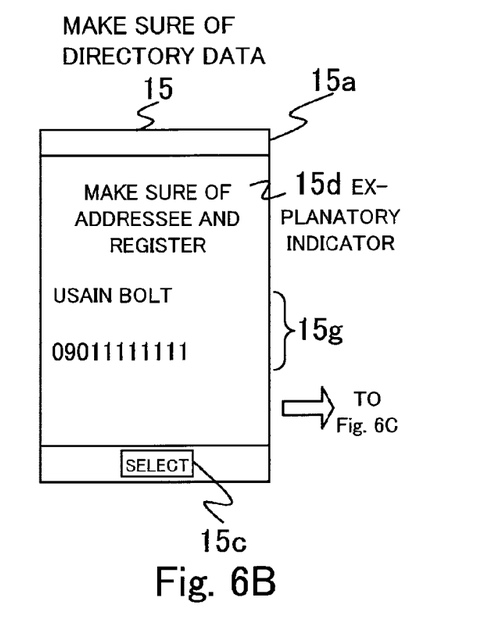

If the select key 16a is operated while a screen shown in FIG. 6A is being displayed, the directory data indicator 15g is displayed again by the controller 11, and an explanatory indicator 15d for confirming whether the person indicated by the directory data indicator 15g may be registered as the safety emails addressee is displayed as shown in FIG. 6B.

Figure 6C:
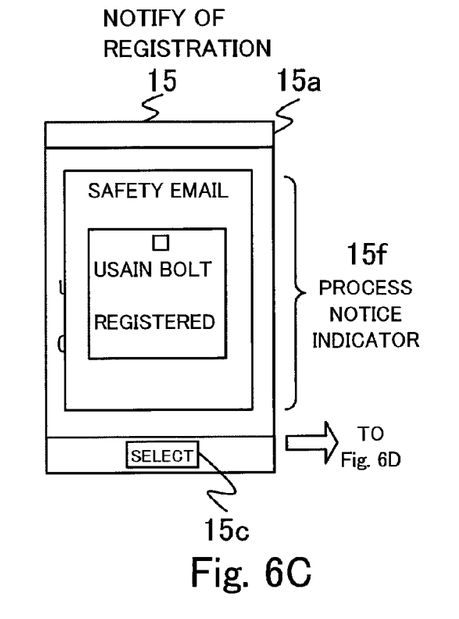
Figure 6D:
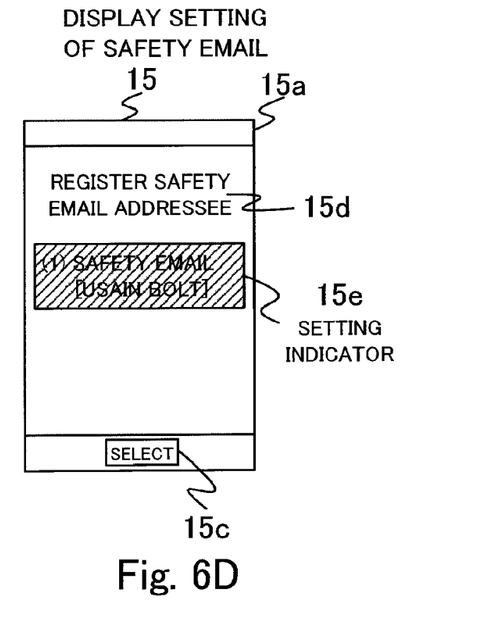

If the select key 16a is operated while a screen shown in FIG. 6B is being displayed, a process notice indicator 15f indicating that safety emails are addressed to the person indicated by the directory data indicator 15g as a new window as shown in FIG. 6C. If the select key 16a is operated while a screen shown in FIG. 6C is being displayed, a setting indicator 15e for indicating that a safety email will be sent to the person is displayed as shown in FIG. 6D. FIG. 6D can be easily understood in contrast to FIG. 4C.

Figure 7A:
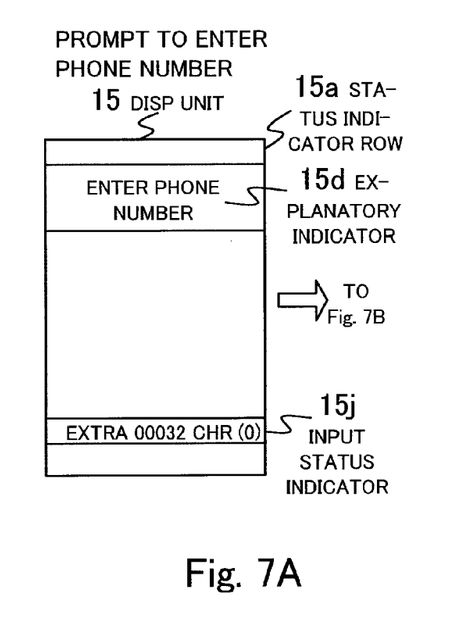
FIGS. 7A-7D show screens displayed on the display unit for choosing and setting a safety email addressee by entering a phone number.

If the select key 16a is operated while the cursor is being located on "(2) enter phone number" in FIG. 5B, a phone number is entered in a procedure shown in FIGS. 7A-7D, and the phone number is set as the identifier of the safety email addressee. That is, first as shown in FIG. 7A an explanatory indicator 15d for prompting a user to enter a phone number and an input status indicator 15j for indicating input status are displayed. In FIG. 7A, the input status is "EXTRA 00032 CHR (0)", indicating that extra 32 characters can further be entered, and that a character to be entered is a one-byte numeral (so called a single byte character).

Figure 7B:
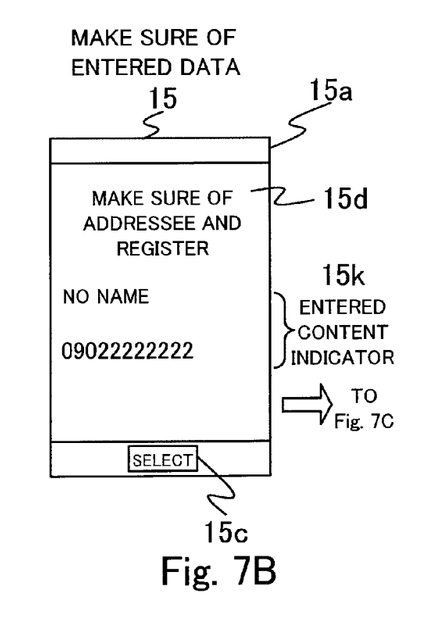

Upon a phone number being entered, the central function indicator 15c "SELECT" appears. If the select key 16a is operated while the above central function indicator 15c is being displayed, an explanatory indicator 15d for prompting a user to make sure of the entered phone number and an entered content indicator 15k including the entered phone number are displayed as shown in FIG. 7B. The entered content indicator 15k includes a name stored in the directory in relation to the phone number. As the name is assumed here to be absent from the directory, though, the example shown in FIG. 7B includes an indication "NO NAME" instead of the name.

Figure 7C:
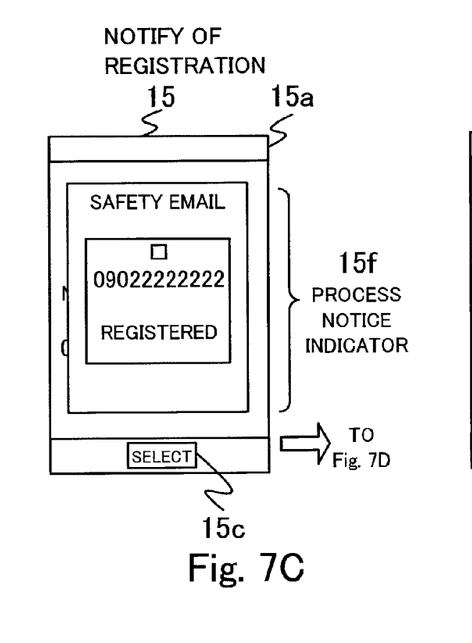
Figure 7D:
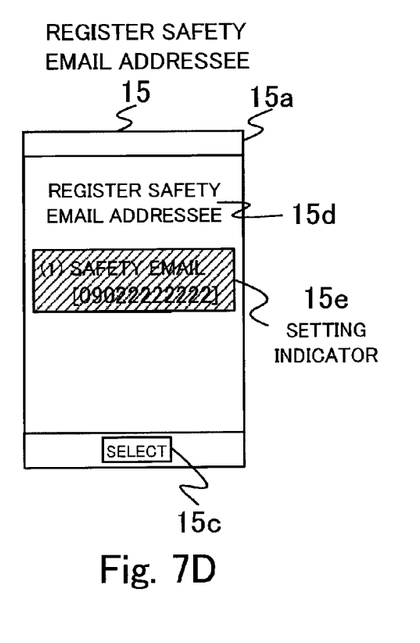

If the select key 16a is operated while a screen shown in FIG. 7B is being displayed, the process notice indicator 15f indicates that a safety email is addressed and sent to someone corresponding to the phone number indicated by the entered content indicator 15k as shown in FIG. 7C. If the select key 16a is operated while the above process notice indicator 15f is being displayed, the setting indicator 15e indicates that a safety email will be addressed and sent to someone corresponding to the phone number as shown in FIG. 7D. FIGS. 7C and 7D correspond to FIGS. 6C and 6D, respectively, and provide similar indications.

Figure 8A:
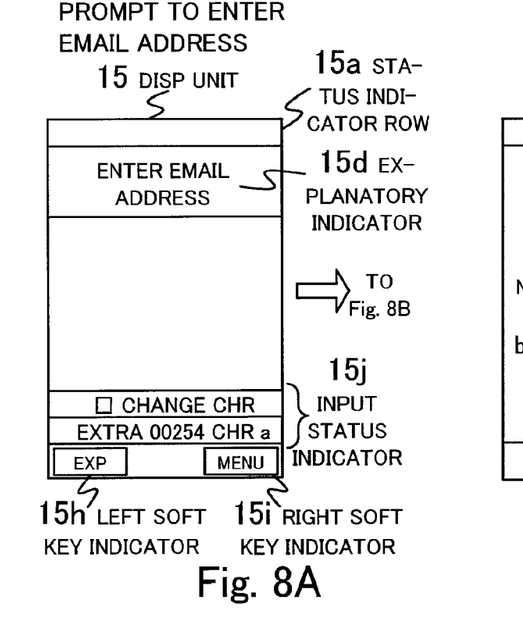
FIGS. 8A-8D show screens displayed on the display unit for choosing and setting a safety email addressee by entering an email address.

If the select key 16a is operated while the cursor is located on "(3) enter email address" in FIG. 5B, the safety email addressee is set by entry of an email address in a procedure shown in FIGS. 8A-8D. That is, first as shown in FIG. 8A, an explanatory indicator 15d for prompting a user to enter an email address and an input status indicator 15j for indicating input status are displayed.

In FIG. 8A, the input status indicates "CHANGE CHR" and "EXTRA 00254 CHR a". Further, as the right soft key indicator 15i indicates "MENU", a menu is displayed upon the second soft key 16d being operated. It is indicated in FIG. 8A that a kind of entered character can be changed in accordance with a selected choice in the menu, that extra 254 characters can further be entered, and that a character to be entered is a one-byte alphabet or symbol.

As a menu is displayed by an operation of the second soft key 16d, symbol characters often included in an email address such as "@" and "_" can be entered by means of fewer operations, and an email address included in the directory or in data relating to the owner of the apparatus can be set as an identifier of the safety email addressee. Moreover, "EXP" indicated by the left soft key indicator 15h indicates that an operation for entering an email address will be explained upon the first soft key 16c being operated.

Figure 8B:
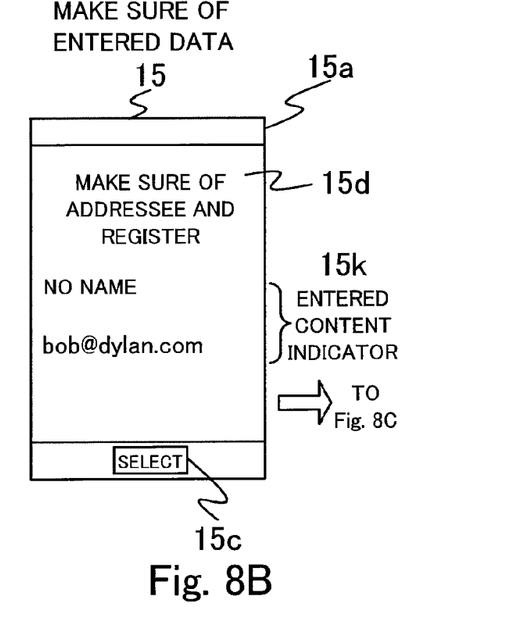

Upon an email address being entered, the central function indicator 15c indicates "SELECT". If the select key 16a is operated while the above central function indicator 15c is being displayed, an explanatory indicator 15d for prompting a user to make sure of the entered email address and an entered content indicator 15k including the entered email address are displayed as shown in FIG. 8B. The entered content indicator 15k includes a name stored in the directory in relation to the email address. As the name is assumed here to be absent from the directory, though, the example shown in FIG. 8B includes an indication "NO NAME" instead of the name.

Figure 8C:
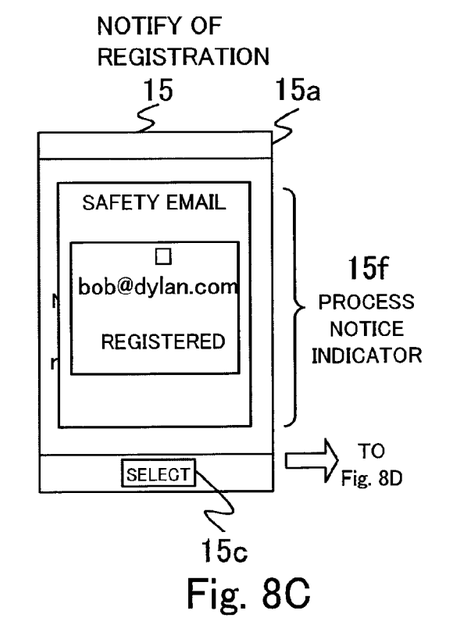
Figure 8D:
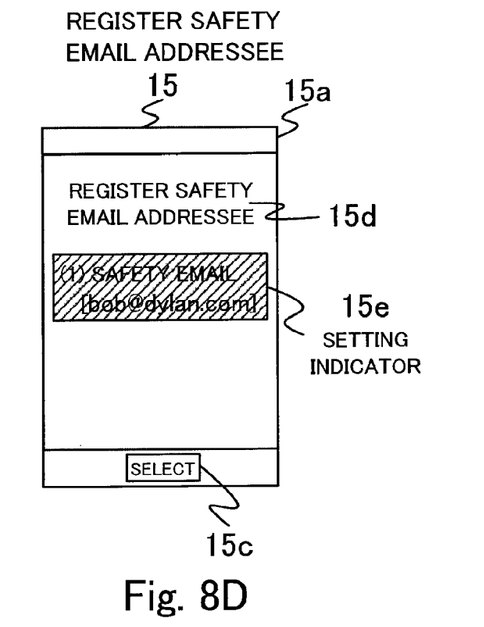

If the select key 16a is operated while a screen shown in FIG. 8B is being displayed, the process notice indicator 15f indicates that a safety email will be addressed and sent to the email address indicated by the input content indicator 15k as shown in FIG. 8C. If the select key 16a is operated while the above process notice indicator 15f is being displayed, the setting indicator 15e indicates that a safety email will be addressed and sent to the email address as shown in FIG. 8D. FIGS. 8C and 8D correspond to FIGS. 7C and 7D, respectively, and provide similar indications.

The control operation for choosing whether or not to send a safety email explained with reference to FIGS. 4A-4D is on condition that the safety email is suspended, and the setting indicator 15e includes "[NOT SEND]" as shown in FIG. 4C. Then, assuming that a safety email is set to be sent and the email address of the safety email addressee has been selected, an operation for changing the email address of the addressee will be explained with reference to indications.

Figure 9A:
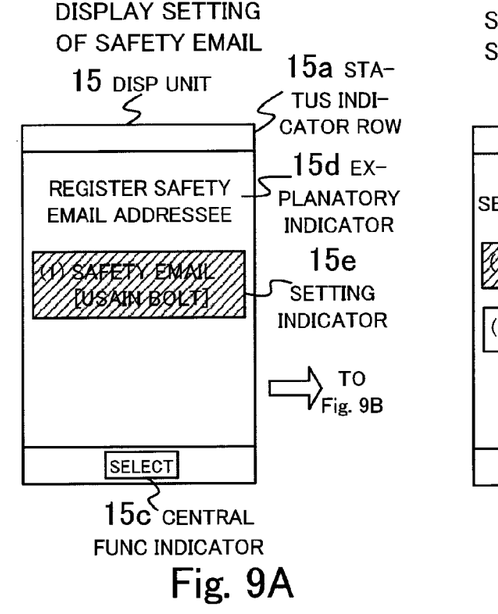
FIGS. 9A-9C show screens displayed on the display unit for changing the safety email addressee.
Figure 9B:
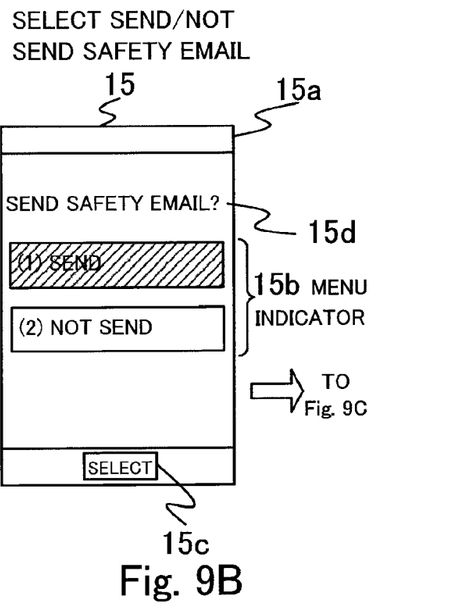
Figure 9C:
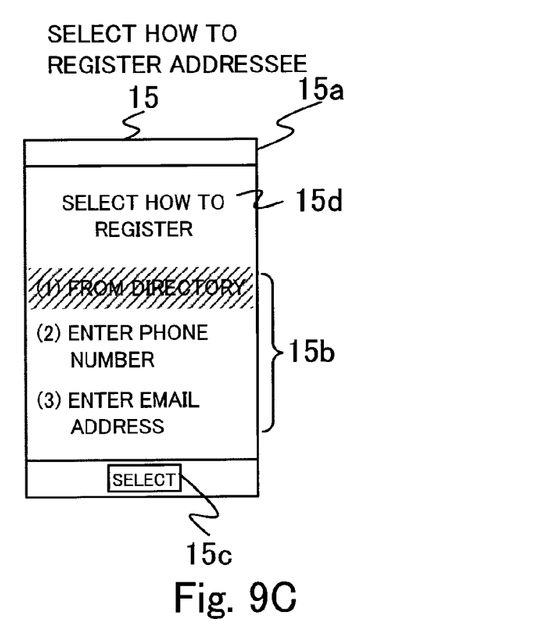

The setting indicator 15e indicates that the safety email addressee has been selected in FIG. 9A which equals FIG. 6D. If the select key 16a is operated while a screen shown in FIG. 9A is being displayed, a screen for selecting whether to send or not a safety email is displayed as shown in FIG. 9B. Although FIG. 9B is same as FIG. 4D, the cursor is located on a choice "(1) SEND", as a safety email is set to be sent. If the select key 16a is operated while the screen shown in FIG. 9B is being displayed, a screen for selecting a method for registering the safety email addressee is displayed as shown in FIG. 9C, which equals FIG. 5B.

If the controller 11 stores the setting of sending a safety email in itself, and upon the open/close sensor 17 sensing that the upper and lower housing sections 1 and 2 change from open to closed to each other, the controller 11 directs the safety email editor 21 to operate.

(Operation for Sending Safety Email by Means of Safety Mail Editor 21 and Email Unit 18)

Figure 10:
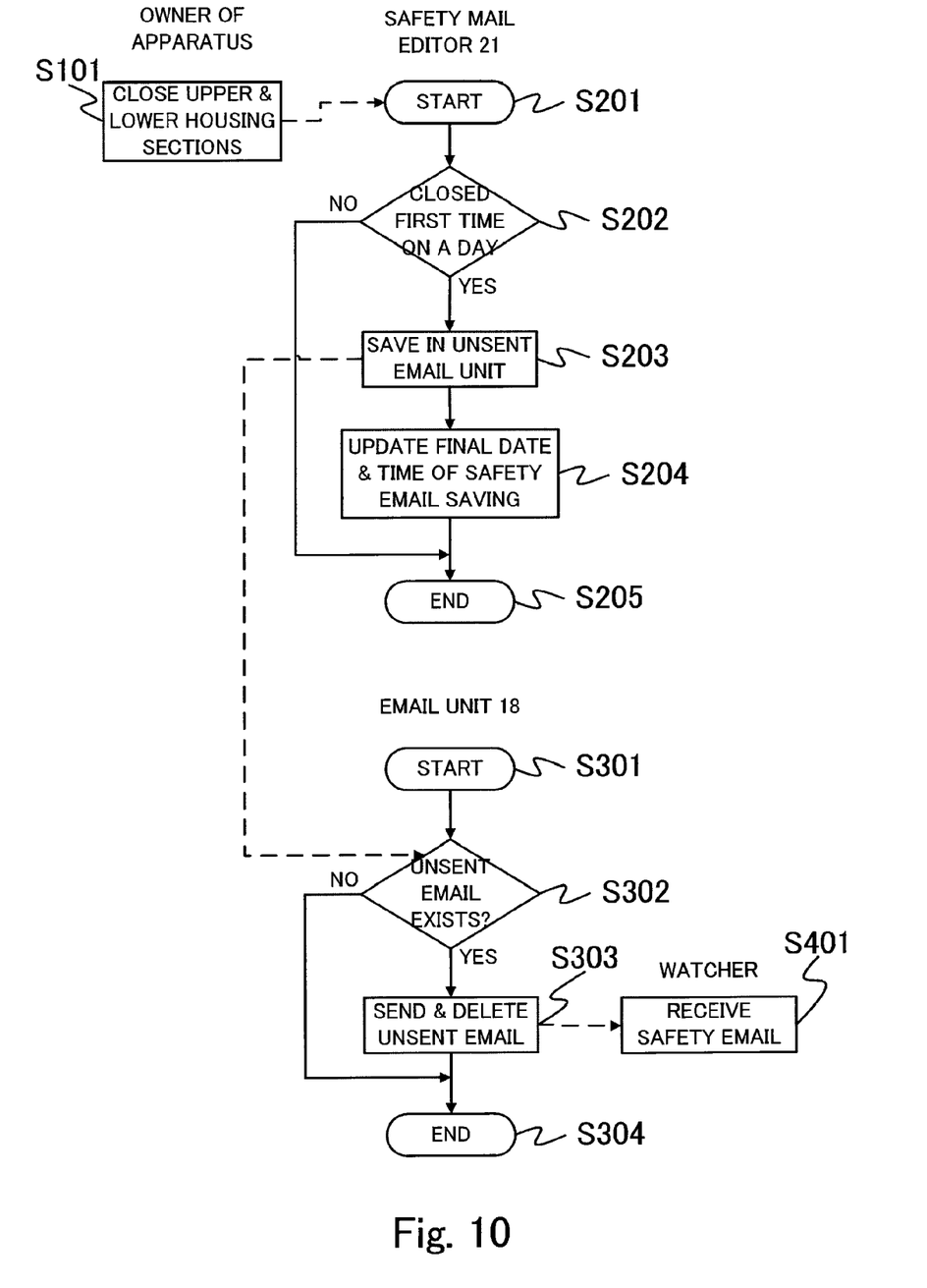
FIG. 10 is a flowchart of a process for sending a safety email by means of a safety email editor and an email unit of the embodiment of the present invention.

FIG. 10 is a flowchart of an operation for sending a safety email by means of the safety email editor 21 and the email unit 18. FIG. 10 shows a human operation for closing the upper and lower housing sections 1 and 2 to each other, an operation of another apparatus owned by the watcher for receiving the safety email as well, so as to collectively show a sequence related to the safety email.

If the upper and lower housing sections 1 and 2 change from open to closed to each other (step S101), the open/close sensor 17 senses that the upper and lower housing sections 1 and 2 are closed to each other. That is a chance for the controller 11 to direct the safety email editor 21 to start an operation for saving a safety email (step S201).

The safety email editor 21 compares the final date and time of safety email saving saved in the email final saving unit 22 and the present date and time indicated by the clock 11a so as to judge whether it was a first chance for the upper and lower housing sections 1 and 2 to be closed to each other in a day (step S202). That is, the safety email editor 21 judges that it was a first chance for the upper and lower housing sections 1 and 2 to be closed to each other in a day, if the date indicated by the clock 11a is different from the final date of safety email saving (it is unnecessary to refer to the time), and if no final date and time of safety email saving is saved (that corresponds to cases where the safety mail editor 21 operates first after delivery, and where the clock control function 11-1 erased the final date and time of safety email saving). If the dates compared above are equal to each other, the safety email editor 21 judges that it was not a first chance.

Upon judging that it was a first chance for the upper and lower housing sections 1 and 2 to be closed to each other, the safety email editor 21 saves in the unsent email saving unit 19 the email address of the addressee, the subject and the message of the safety email saved in the safety email editor 21 (step S203). Further, the safety email editor 21 updates the final date and time of safety email saving by using the date and time indicated by the clock 11a (step S204), and ends the operation for saving the safety email (step S205). Otherwise, the safety email editor 21 immediately ends the operation for saving the safety email (step S205).

The email unit 18 starts operation at certain intervals (e.g., of one minute) (step S301), and checks whether an unsent email including the safety email saved at the step S203 is saved in the unsent email saving unit 19 (step S302). If yes, the email unit 18 directs the transceiver 13 to send the saved unsent email and deletes that email from the unsent email saving unit 19 (step S303), and then ends the operation for sending the unsent email including the safety email (step S304). If no, the email unit 18 immediately ends the operation for sending the unsent email including the safety email (step S304).

Due to the operation for sending the unsent email at the step S303, the watcher can receive the safety email (step S401). If the transceiver 13 does not send the email even after a certain period of time at the step S303 (in a case where, e.g., the mobile communication apparatus is out of service coverage of the mobile communication network), the email unit 18 ends the operation for sending the unsent email without deleting the unsent email (not shown).

After the upper and lower housing sections 1 and 2 are closed to each other and the safety email editor saves the safety email, the apparatus probably sends the email in a short period of time, i.e., while the upper and lower housing sections 1 and 2 are being closed to each other, due to the operations described above. Thus, as the apparatus less probably sends the above email and works as operated by a user at the same time differently from a case where the email is sent after the upper and lower housing sections 1 and 2 are open to each other, the apparatus does not need high performance. Further, the apparatus does neither increase power consumption nor impose a burden on the storage battery.

Even if the upper and lower housing sections 1 and 2 become open to each other before the above email is sent or while the above email is being sent, or even if the apparatus starts working in accordance with a user's key operation on the input section 16, the email unit 18 continues the operation for sending the unsent email. Further, after saving the safety email in the unsent email saving unit 19, the email editor 21 may activate and direct the email unit 18 to send the unsent email. Due to the above process, the apparatus least probably sends the above email and works in accordance with the user's operation at the same time.

In the above description, the safety email editor 21 provides every safety email with a same object and a same message. The safety email editor 21 is not limited to the above, and may provide each of safety emails with a subject and a message which may be possibly different from each other.

The subject, and the message as well, of the safety email may include a phone number for the mobile communication network of the apparatus, a date and time indicated by the clock 11a upon the safety email being saved in the unsent email saving unit 19, latitude and longitude measured by a GPS measurement unit (not shown) at that moment, and data specifying a position identified by the latitude and longitude such as data indicating a regional name, the owner's or a relative's home. Someone in relation to the owner of the apparatus can be more specifically aware of his or her safety with reference to such kinds of data.

The regional name can be obtained from the latitude and longitude with reference to map data stored in the apparatus. The data indicating the owner's or a relative's home can be obtained from the latitude and longitude with reference to data formed by the latitude and longitude and the data indicating the owner's or a relative's home connected to each other and stored in the apparatus.

In a case where each of safety emails is possibly provided with a subject and a message which are different from each other, as described above, it is preferable for the watcher to receive a latest one of safety emails produced on a same day and to be received at a same time. Thus, if a safety email saved in the unsent email saving unit 19 on that day remains in the unsent email saving unit 19 (which corresponds to a case where the apparatus is located out of the service coverage and the unsent email cannot be sent, etc.) and the upper and lower housing sections 1 and 2 are closed to each other, the apparatus may delete the unsent email saved in the unsent memory unit 19, produce a new safety email and save it in the unsent email saving unit 19.

In the above description, the date implicitly means 24 hours starting from midnight. The date is not limited to the above, and may be 24 hours starting from an optional time preset or directed by a key operation on the input section 16, e.g., 7 o'clock in the morning, i.e., the time someone in relation to the email address addressed by the safety email, i.e., the watcher, gets up.

According to the above process, the safety email editor 21 saves the above optional time and refers to the time as well as the date included in the date and time indicated by the clock 11a and in the final date and time of safety email saving. According to the above process, it is less probable for the watcher that he or she receives a safety email while asleep and his or her sleep is disturbed.

As described above, upon the upper housing section 1 and the second housing section 2 being closed to each other for the first time in a day, the safety email editor 21 saves a safety email in the unsent email saving unit 19. Further, the email unit 18 sends the unsent email saved in the unsent email saving unit 19 in, e.g., a couple of minutes except in a case where the apparatus exists out of the service coverage of the mobile communication network. As a result, the safety email may possibly be received by an apparatus in relation to the email address addressed by the safety email at any time on that day. The configuration of the safety email editor 21 is, however, not limited to the above.

That is, the safety email editor 21 divides a day into a first time range and a second time range, and saves the above time ranges in memory. The first time range is, e.g., from 7 o'clock in the morning to 11 o'clock in the afternoon in which someone in relation to the email address addressed by the safety email address, i.e., the watcher, is probably awake. The second time range is from 11 o'clock in the afternoon to 7 o'clock in the next morning, in which the watcher is probably asleep.

Then, the safety email editor 21 attaches the first time range to a safety email and saves the safety email in the unsent email saving unit 19 with the first time range. Further, the email unit 18 sends the unsent email only if the present time indicated by the clock 11*a* is within the time range attached to the unsent email. On the other hand, the safety email editor 21 may attach the second time range to a safety email for saving it, and the email unit 18 may send the safety email only if the present time indicated by the clock 11*a* is out of the time range attached to the unsent email. According to the above process, the watcher less probably receives the safety email while asleep, and his or her sleep is less probably disturbed.

In the above description, a safety notice is carried by a safety email, i.e., a kind of electronic mail. The safety notice is not limited to the above, and may be carried by a short message addressed at a mobile communication apparatus specified by a phone number through a voice channel.

In the above description, the clock control function 11-1 erases the data of the final date and time of safety email saving upon the clock 11*a* being changed. According to the above process, there is no such a thing that, although the upper and lower housing sections 1 and 2 are closed to each other one day, no safety email is sent on the same day as the clock 11*a* has been changed. Meanwhile, a plurality of safety emails may possibly be sent on the day of the above change of the clock 11*a*.

Thus, the clock control function 11-1 may be configured not to erase the data of the final date and time of safety email saving in a case where the date in the date and time indicated by the clock 11*a* before the change and the date in the final date and time of safety email saving. Judgment of a same day based on the date and time indicated by the clock 11*a*, however, may be different from judgment of a same day based on a date and time indicated by a correct clock, In the above description, the safety email editor 21 saves a safety email in the unsent email saving unit 19 upon the upper and lower housing sections 1 and 2 being closed to each other. The safety email editor 21 is not limited to the above, and if the upper and lower housing sections 1 and 2 are not closed to each other all day long, the safety email editor 21 may save a safety email mentioning that fact in the unsent email saving unit 19. That is, the controller 11 directs the safety email editor 21 to operate after the day changes. If the day before the change is not saved as the final date of safety email saving, the safety email editor saves in the unsent email saving unit 19 a safety email mentioning that the upper and lower housing sections 1 and 2 were not closed to each other on the day before the change.

As described above, the present invention is applied, e.g., to a flip type mobile communication apparatus. The present invention is not limited to the above, and may be applied to every mobile communication apparatus having a housing section configured to be open and closed, e.g., of a slide type, as a matter of course. In a configuration of a slide type mobile communication apparatus, the display unit 15 is provided on a front face of a front housing section, and is visible regardless of whether the housing section is open or closed. Further, at least a portion of the input section 16 is provided on a front face of a rear housing section, and is operable and inoperable if the housing sections are open and closed, respectively.

If the housing sections are closed, a user cannot make the apparatus start to work by operating at least some keys of the input section 16, regardless of whether the housing sections are of a flip type or a slide type. That is, if the upper and lower housing sections 1 and 2 are closed to each other, it is expected that the owner of the apparatus has probably operated the keys of the input section 16 so as to make the apparatus work as desired, and that he or she is safe.

If the housing sections are closed, at least a portion of a screen of the display unit 15 is invisible. That is, if the upper and lower housing sections 1 and 2 are closed to each other, it is expected that the owner of the apparatus has probably made the display unit 15 display something as desired, and that he or she is safe. There is no difference even if he or she only views the date and time indicated by the clock 11*a*.

As described above, the present invention is applied, e.g., to a so called mobile phone. The present invention is not limited to the above, and may be applied to every mobile communication apparatus having a housing section configured to be open and closed, e.g., a mobile personal computer as a matter of course. The present invention is not limited to the above configurations, and may be variously modified.

What is claimed is:

1. A mobile communication apparatus, comprising:
   a first housing section;
   a second housing section movably connected to the first housing section, the second housing section being configured to be open or closed to the first housing section;
   an open/close sensor configured to sense whether the first housing section and the second housing section are open or closed to each other;
   an email saving controller configured to save an email addressed to a particular address upon the open/close sensor sensing that the first housing section and the second housing section being closed to each other; and
   an email sending controller configured to send the email saved by the email saving controller to the particular address.

2. The mobile communication apparatus according to claim 1, further comprising a clock configured to indicate a date and time, wherein the email saving controller is further configured to refer to the date and time so as to save the email once a day.

3. The mobile communication apparatus according to claim 1, further comprising a clock configured to indicate a date and time, wherein
   the email saving controller is further configured to refer to the date and time so as to save the email once a day,
   the email saving controller being further configured to save the date as a date of email saving upon saving the email,
   the email saving controller being configured to save the email only if the date is different from the date of email saving.

4. The mobile communication apparatus according to claim 1, further comprising a clock configured to indicate a date and time with respect to a specified interval of 24 hours, wherein the email saving controller is further configured to refer to the date and time so as to save the email once a day defined in the specified interval of 24 hours.

5. The mobile communication apparatus according to claim 1, further comprising a clock configured to indicate a date and time with respect to a specified interval of 24 hours, wherein the email saving controller is further configured to refer to the date and time so as to save the email once a day defined in the specified interval of 24 hours, the email saving controller being further configured to save the date with respect to the specified interval of 24 hours as a date of email saving upon saving the email, the email saving controller being configured to save the email only if the date with respect to the specified interval of 24 hours is different from the date of email saving.

6. The mobile communication apparatus according to claim 1, further comprising a clock configured to indicate a date and time, wherein the email saving controller is further configured to specify a time range in which the email saved by the email saving controller is allowed to be sent, and the email sending controller is further configured to refer to the clock so as to send the email saved by the email saving controller only in the time range.

7. The mobile communication apparatus according to claim 1, further comprising a lock controller configured to control locking of the mobile communication apparatus, wherein the email saving controller is further configured to be prevented from saving the email upon the lock controller locking the mobile communication apparatus.

8. A method for sending an email by means of a mobile communication apparatus having a first housing section and a second housing section movably connected to the first housing section, comprising:

sensing whether the first housing section and the second housing section are open or closed to each other;

saving an email addressed to a particular address upon the first housing section and the second housing section being sensed being closed to each other; and sending the saved email to the particular address.

9. The method for sending an email according to claim 8, further comprising referring to a date and time so as to save the email once a day.

10. The method for sending an email according to claim 8, further comprising:

referring to a date and time so as to save the email once a day;

saving the date as a date of email saving upon saving the email; and saving the email only if the date is different from the date of email saving.

11. The method for sending an email according to claim 8, further comprising referring to a date and time with respect to a specified interval of 24 hours so as to save the email once a day defined in the specified interval of 24 hours.

12. The method for sending an email according to claim 8, further comprising:

referring to a date and time with respect to a specified interval of 24 hours so as to save the email once a day defined in the specified interval of 24 hours;

saving the date with respect to the specified interval of 24 hours as a date of email saving upon saving the email; and saving the email only if the date with respect to the specified interval of 24 hours is different from the date of email saving.

13. The method for sending an email according to claim 8, further comprising:

specifying a time range in which the saved email is allowed to be sent; and referring to time so as to send the saved email only in the time range.

14. The method for sending an email according to claim 8, wherein the email is prevented from being saved upon the mobile communication apparatus being locked.

* * * * *